A. WOLF.
DUST SEPARATOR.
APPLICATION FILED SEPT. 27, 1910.
1,025,730.
Patented May 7, 1912.
2 SHEETS—SHEET 1.
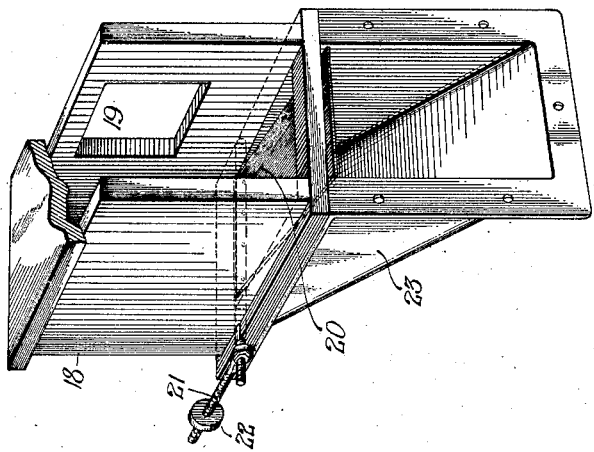
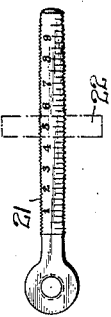
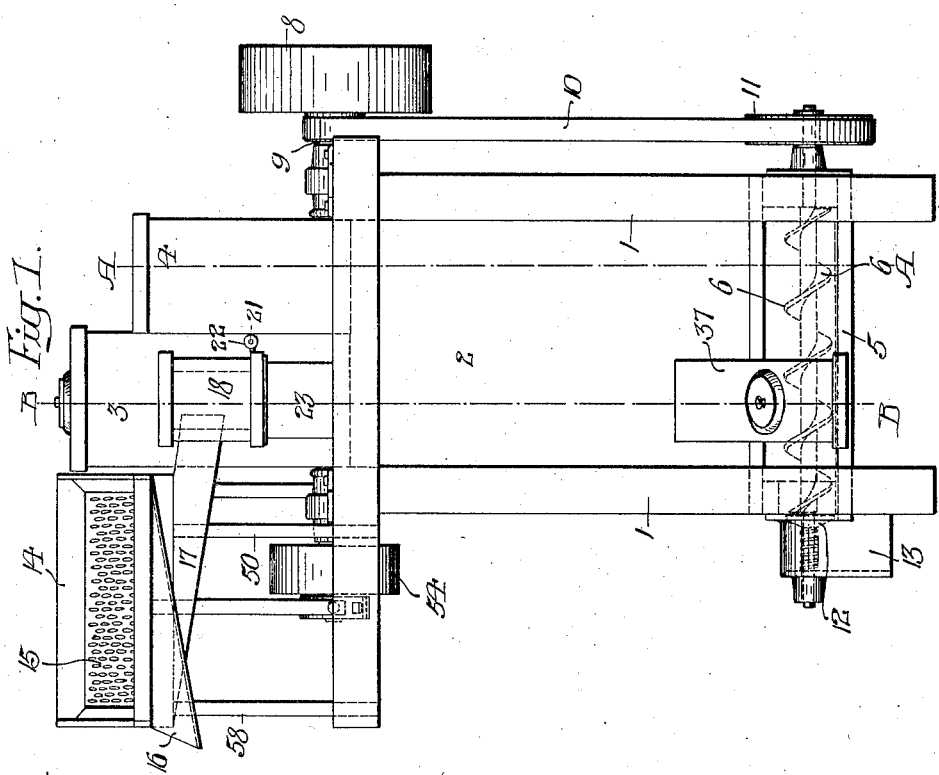
Witnesses,
Inventor.
Augustus Wolf,
by Howson & Howson
Harry Howson
Attorneys.

A. WOLF.
DUST SEPARATOR.
APPLICATION FILED SEPT. 27, 1910.
1,025,730.
Patented May 7, 1912.
2 SHEETS—SHEET 2.
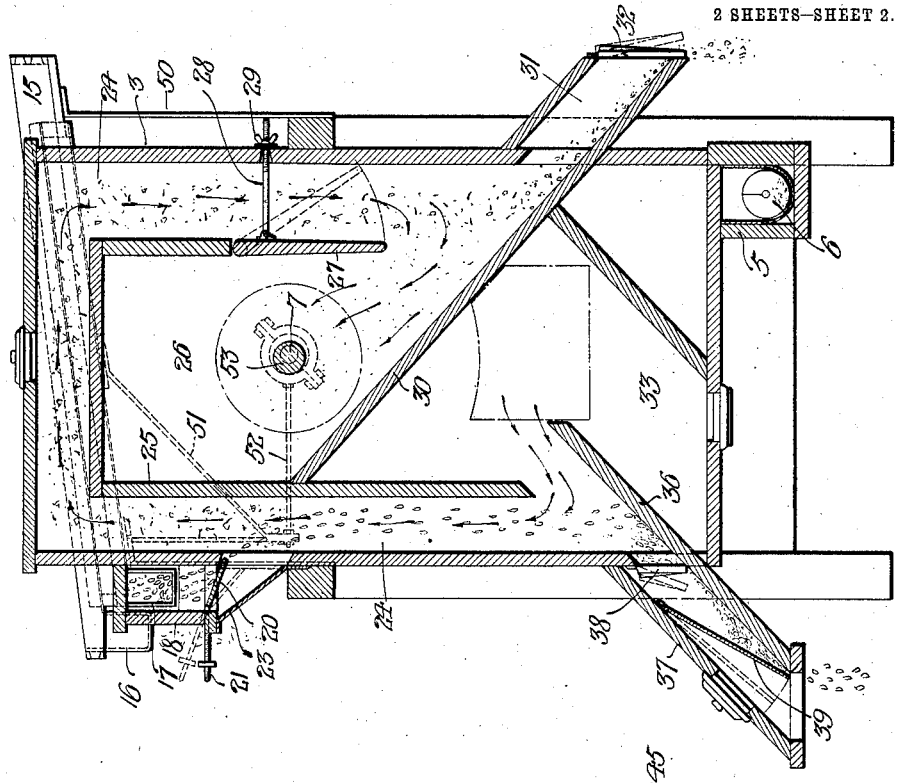
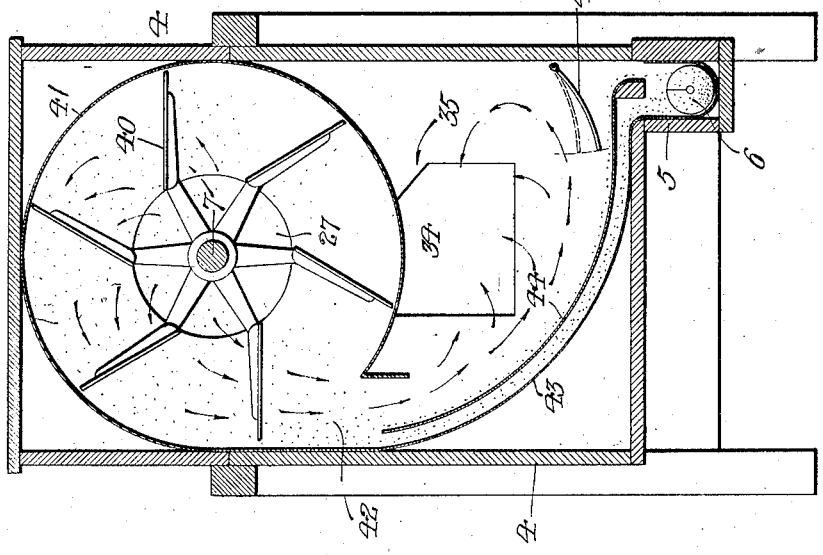
Witnesses.
Inventor.
Augustus Wolf.
by Howson & Howson
Henry Howson
Attorneys.

UNITED STATES PATENT OFFICE.

AUGUSTUS WOLF, OF CHAMBERSBURG, PENNSYLVANIA.

DUST-SEPARATOR.

1,025,730.  Specification of Letters Patent. Patented May 7, 1912.

Application filed September 27, 1910. Serial No. 584,053.

*To all whom it may concern:*

Be it known that I, AUGUSTUS WOLF, a citizen of the United States, and a resident of Chambersburg, Franklin county, Pennsylvania, have invented certain Improvements in Dust-Separators, of which the following is a specification.

One object of my invention is to provide a machine of a novel construction particularly designed to completely and efficiently separate dust and other foreign material from grain; it being especially desired that the machine shall be capable of rapid operation, shall be simple in construction, and of such a design as will permit it to repeatedly use the air employed for its operation. These objects and other advantageous ends I secure as hereinafter set forth, reference being had to the accompanying drawings, in which:—

Figure 1, is a side elevation of a machine constructed according to my invention; Fig. 2, is a perspective view, on a somewhat enlarged scale, illustrating the receiving hopper with its coöperating parts; Fig. 3, is a side elevation of the adjustable weight or counterbalance for the hopper valve, and; Figs. 4 and 5 are vertical sections on the lines A—A and B—B, Fig. 1.

In the above drawings, 1 represents the frame of the machine on which is supported a casing 2 divided by a suitable partition into two parts 3 and 4. Extending longitudinally of the casing at the lower portion thereof is a conveyer trough 5 communicating with the compartment 4, as illustrated in Fig. 4, and containing a screw or other suitable conveyer 6.

Mounted in bearings on the frame and extending through the casing, is a driving shaft 7, on one end of which is mounted a pulley 8 to which power is applied for operating the machine. Through a pulley 9 on the shaft 7, a belt 10 and a second pulley 11 on the shaft of the conveyer 6, power is transmitted from said shaft 7 to drive said conveyer, which discharges through a normally closed spring pressed valve 12 into a hollow casting 13 to which may be connected any desired receptacle for dust.

Mounted adjacent the casing 2 is a shaking shoe 14 consisting of an open topped box-like structure having a hopper bottom over which is mounted an inclined screen 15 terminating at and discharging into a tailing trough 16. In order that the grain may be caused to flow through the shoe 14, this is mounted on spring straps 50 and provided with a bracket 51 connected through a rod 52 with an eccentric strap operative on an eccentric 53 fixed to the shaft 7. From the hopper bottom under the screen 15, a spout 17 leads into the hopper 18 of the separator casing and this hopper is constructed as shown in Fig. 2;—that is to say, it consists of a closed box projecting from one side of the compartment 3 and provided with an opening 19 in one side for the reception of the spout 17. The bottom of this structure is formed by a pivoted valve 20 normally held closed by an arm 21 having a weight 22 threaded upon it so as to permit of its accurate adjustment; it being possible to thus set said valve so that it will open only when a predetermined amount of material rests upon it and will automatically return to its closed position when said material is removed. From the bottom of the hopper structure 18 an inclined chute 23 leads through a suitable opening in the side of the compartment 3 into an air trunk 24 formed by the casing 2 and a partition 25; this trunk extending up one side of the compartment 3, across the top, and down the other side thereof where it opens into a chamber 26 communicating through an opening 27 with the compartment 4.

In order to regulate the flow of air through the trunk 24, I place at its discharge end a pivoted or other valve 27 capable of being adjusted by means of a bolt 28 connected to it and extending outside of the compartment 3 where its end is threaded and provided with a thumb nut 29. By drawing said bolt in or out, the position of the valve may be varied from that shown in full lines to that shown in dotted lines and the air flow correspondingly varied. The bottom 30 of the chamber 26 is inclined at an angle of about 45° to the horizontal and terminates in a discharge spout 31 having an automatic, normally closed valve 32. Under this chamber 26 is a second chamber 33 connecting with the intake of the trunk 24 and also through an opening 34 with a settling chamber 35 in the compartment 4.

An inclined partition 36 is extended under the intake end of the trunk 24 immediately below the opening from the hopper chute 23 and this partition is continued outside of the casing as a spout 37; there being provided two valves 38 and 39 designed to normally remain closed but capable of being opened by a predetermined weight of grain or other material pressing against them.

In the compartment 4 is mounted a fan 40 fixed to and driven from the shaft 7 and surrounded by a casing 41 constituting a fan inclosure. This casing communicates through a tangentially placed outlet 42 with a settling chamber 35 and said chamber has its floor or lowermost portion formed by a curved wall 43 arranged eccentrically to the shaft 7 and extending from the outer portion of the outlet 42 downwardly and over to the edge of the conveyer trough 5, where it terminates. Immediately above and substantially parallel with this wall is a similarly curved partition 44 extending so as to form a narrow conduit having the width of the compartment 4 and leading from the outlet 42 of the fan casing to the conveyer trough 5. The lower end of this partition terminates over the trough 5 so that any material falling upon it will ultimately drop into the said trough. The passage of air into the trough is limited by a valve 45 extending across the bottom of the compartment 4 and adjustable as to the distance between its free end and the partition 44 as indicated in dotted lines in Fig. 4. In order to balance the side pull on the shaft 7 due to the shaking shoe 14 when the device is working, I mount a balance or fly wheel 54 on said shaft adjacent said eccentric.

Under operative conditions the turning of the shaft not only operates the fan, but, through the eccentric 53 gives a vibratory motion to the shaking shoe 14 and through the belt 10 drives the conveyer 6. If the various valves are properly adjusted and grain to be cleaned is supplied to the shoe 14, any large pieces of foreign material or particles of chaff are shaken down the screen 15 into the tailing spout 16, while the grain passes through said screen into the chute 17. From this it is delivered into the hopper 18 and after a certain amount has accumulated on the valve 20, it overbalances the weighted arm 21 so that the valve 20 moves downwardly and permits said grain to slide through the chute 23 into the upper portion of the trunk 24. The fan 40 is so turned that air is driven from the casing 41 through the outlet 42, thence into the settling chamber 35 through the opening 34, into the compartment 3, into and through the trunk 24 to the chamber 26 and thence through the opening 27 into the fan casing 40. As a consequence, the grain falling into the trunk 24 meets a rising current of air which effectively removes from it any particles of dust or dirt while permitting the cleaned grain to fall onto the partition 36 and flow from time to time into and through the spout 37 past the valves 38 and 39. The dust and other like material taken from the grain is carried up, across and finally down through the trunk 24 into the chamber 26, where the heavier particles, owing to the slowing down of the air current, fall onto the incline 4 and pass to the spout 31. The lighter impalpable dust particles continue, however, through the opening 27 into the fan casing 40 where they are given a rapid whirling motion and finally discharged with the air through the outlet 42. Owing, however, to the fact that the dust is heavier than the air, the particles under the action of centrifugal force, move in that portion of the air current farthest from the center of the fan and by far the greater portion of them are caused to enter the conduit formed by the wall 33 and the partition 44, especially as this is curved away from and in continuation of the outlet 42.

Partly under the action of gravity and partly due to their momentum and the air current flow, such particles of dust are moved through this conduit and finally discharged into the conveyer trough 5, from whence they are delivered from time to time past the valve 12 into the discharge bowl 13. The greater volume of the air coming from the fan casing 40 passes from the outlet 42 into the settling chamber 45 where its velocity is greatly diminished and the lightest particles of dust permitted to fall on the upper surface of the partition 44, from which they are finally delivered into the conveyer trough 5 under the valve 45. The air from the settling chamber 45 flows into the chamber 33 of the compartment 3 and thence into the trunk 24 as above described. Owing to the arrangement of the valves and by reason of their automatic action, there is practically no escape of air from my machine during its operation, since all of said valves open only long enough to admit material or to discharge the same, and close as soon as such material has passed them.

I claim:—

The combination in a dust separator, of a casing having two vertically extended compartments arranged side by side; an air trunk extending up one side, across the top and down the opposite side of one compartment; means for feeding material to be cleaned into the ascending part of said trunk; an outlet chute having an extension projecting under but spaced away from the said ascending part of the trunk; a second outlet chute having an inclined extension projecting under but spaced away from the lower end of the descending part of the trunk; said extension passing across the compartment to the ascending part of the trunk; a fan in the second compartment having its intake connected to the space defined by said latter extension and the air trunk; and a casing surrounding the fan and opening into a part of the second compartment below said inclined extension.

In testimony whereof, I have signed my name to this specification, in the presence of two subscribing witnesses.

AUGUSTUS WOLF.

Witnesses:
WILLIAM E. BRADLEY,
WM. A. BARR.

Copies of this patent may be obtained for five cents each, by addressing the "Commissioner of Patents, Washington, D. C."